(12) United States Patent
Caretta et al.

(10) Patent No.: US 8,474,500 B2
(45) Date of Patent: Jul. 2, 2013

(54) PRESSURE MONITORING AND ADJUSTMENT FOR TWO WHEELED VEHICLE WITH WHEEL BASED PRESSURE RESERVOIR

(75) Inventors: Renato Caretta, Milan (IT); Massimo Filippi, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 1008 days.

(21) Appl. No.: 11/992,186

(22) PCT Filed: Sep. 23, 2005

(86) PCT No.: PCT/IB2005/003079
§ 371 (c)(1),
(2), (4) Date: May 5, 2009

(87) PCT Pub. No.: WO2007/034261
PCT Pub. Date: Mar. 29, 2007

(65) Prior Publication Data
US 2009/0211684 A1    Aug. 27, 2009

(51) Int. Cl.
*B29C 73/18* (2006.01)
*B60C 23/10* (2006.01)
*B60C 29/00* (2006.01)
*B60C 23/00* (2006.01)
*B60C 23/02* (2006.01)
*B62C 1/00* (2006.01)

(52) U.S. Cl.
USPC ........... 152/509; 152/418; 152/417; 152/415; 340/442; 340/447; 340/443; 73/146.3; 73/146.2; 280/63

(58) Field of Classification Search
USPC .................... 340/442, 444, 447, 448, 426.11, 340/445, 429, 425.5, 426.24, 426.33, 440, 340/686.1; 73/146, 146.2, 146.3, 146.4, 146.5, 73/146.8; 152/331.1, 415, 418, 509, 519
See application file for complete search history.

(56) References Cited

U.S. PATENT DOCUMENTS

| 4,067,376 A | 1/1978 | Barabino |
| 5,168,751 A | 12/1992 | Hwang |

(Continued)

FOREIGN PATENT DOCUMENTS

| EP | 1 262 339 A1 | 12/2002 |
| WO | WO-03/057515 A1 | 7/2003 |

*Primary Examiner* — Jennifer Mehmood
*Assistant Examiner* — Mirza Alam
(74) *Attorney, Agent, or Firm* — Finnegan, Henderson, Farabow, Garrett & Dunner, L.L.P.

(57) ABSTRACT

A method of allowing control of a vehicle with at least two-wheels in case of puncture of a tire, each wheel including a rim and a tire associated therewith, includes the steps of: inflating each tire to an operating pressure; admitting a fluid compressed to a first pressure higher than the operating pressure of the tire into at least one tank associated with at least one of the rims; bringing the tire into communication with the tank when the inner pressure of the tire is lower than a predetermined first threshold value; detecting a variation of an inner pressure of the tank; activating a pressure measuring device when the inner pressure variation corresponds to a reduction and is higher than a first predetermined value; measuring the inner pressure of the tank with a predetermined frequency by means of (through) the pressure measuring device; calculating a variation in the inner pressure in a time unit; generating an alarm signal when the calculated inner pressure variation corresponds to a reduction and is higher than a second predetermined value; and transmitting the alarm signal to the driver.

64 Claims, 5 Drawing Sheets

U.S. PATENT DOCUMENTS

| | | |
|---|---|---|
| 5,179,856 A | 1/1993 | Huang |
| 5,293,919 A | 3/1994 | Olney et al. |
| 5,895,846 A * | 4/1999 | Chamussy et al. ........... 73/146.2 |
| 6,518,877 B1 * | 2/2003 | Starkey et al. ................ 340/447 |
| 2002/0104374 A1 * | 8/2002 | Merendino, Sr. ........... 73/146.3 |
| 2004/0007302 A1 * | 1/2004 | Hamilton et al. ............. 152/416 |
| 2004/0008107 A1 * | 1/2004 | Boulot ......................... 340/442 |
| 2004/0112130 A1 | 6/2004 | Maquaire |
| 2005/0081973 A1 * | 4/2005 | Marin-Martinod ........... 152/415 |
| 2005/0194080 A1 * | 9/2005 | White et al. ................. 152/417 |

* cited by examiner

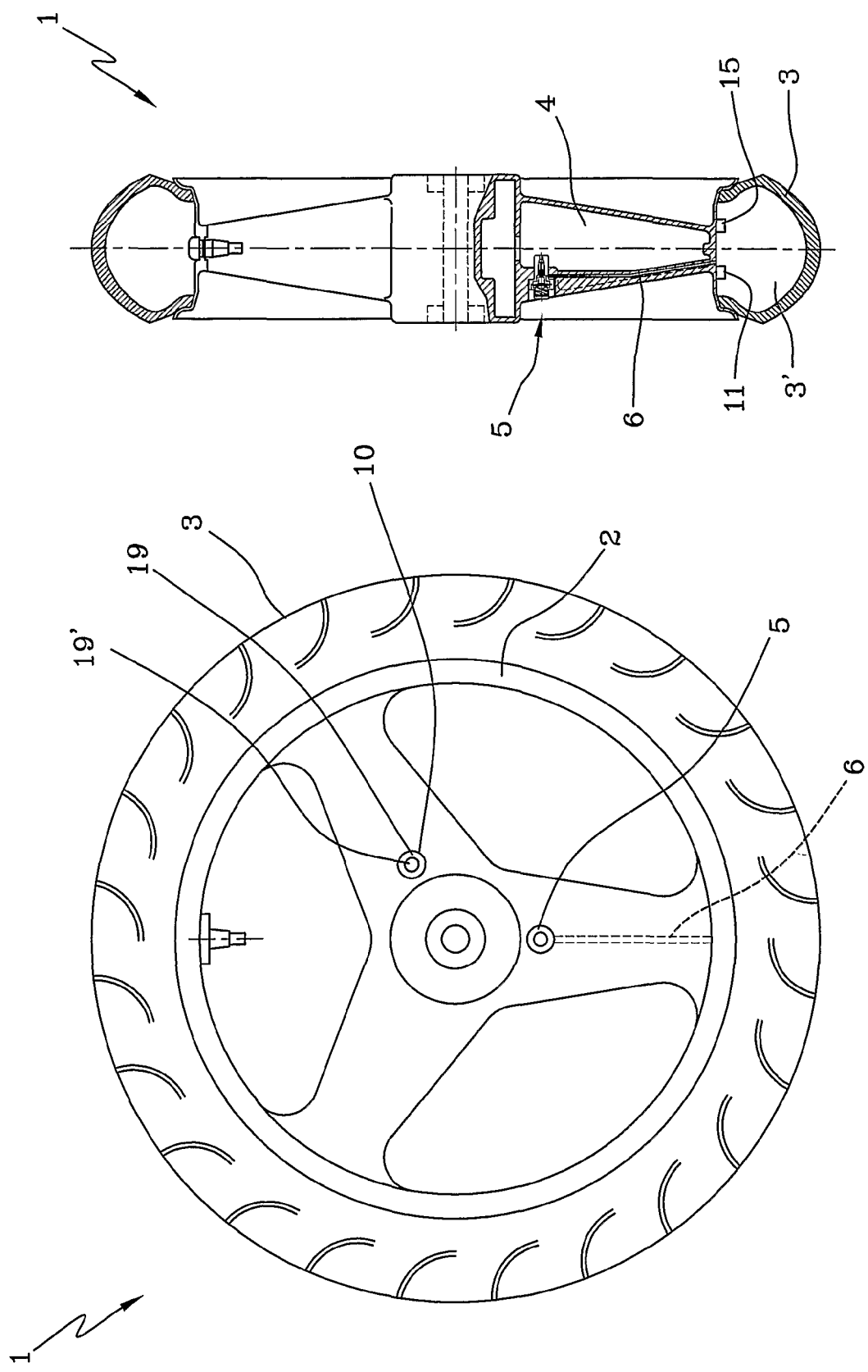

PRESSURE MONITORING AND ADJUSTMENT FOR TWO WHEELED VEHICLE WITH WHEEL BASED PRESSURE RESERVOIR

CROSS REFERENCE TO RELATED APPLICATION

This application is a national phase application based on PCT/IB2005/003079, filed Sep. 23, 2005, the content of which is incorporated herein by reference.

BACKGROUND OF THE INVENTION

1. Field of the Invention

The present invention relates to a method for allowing a control of a vehicle provided with at least two wheels in case of puncture of a tyre.

2. Description of the Related Art

A wheel for a two- or four-wheeled vehicle generally comprises a rim coupled with a tyre that is inflated to a given operating pressure.

Said tyre generally comprises a carcass structure having at least one carcass ply and at least one annular reinforcing structure associated with the carcass ply, a tread band of elastomer material applied to the carcass structure at a radially external position, a belt structure interposed between the carcass structure and the tread band and a pair of sidewalls at axially opposite positions on the carcass structure.

In tubeless tyres, the tyre airtightness is ensured by the radially internal layer of said carcass structure generally referred to as "liner". In use, due to the natural air leakage through said liner (which in any case is never perfectly impervious to air), pressure within the tyre decreases so that the vehicle's driver is forced to carry out a periodical restoration of said pressure.

In an attempt to make the tyre pressure substantially constant over a rather long period of time, use of rims internally housing a tank containing a fluid under pressure (such as air, nitrogen or other substantially inert gases) has been suggested, in which tank there is a pressure higher than the operating pressure of the tyre. By means of one or more valves suitably operated, the required pressure is restored when needed.

U.S. Pat. No. 4,067,376 shows an alarm system connected with the pressure in a tyre which comprises a pressure-sensitive device susceptible of being mounted to the wheel and suitable to emit sonic or ultrasonic signals each time the inner pressure of the tyre exceeds a maximum value or is lower than a minimum value. Also shown is a system for automatically reintroducing the air lost by a tyre while a vehicle is running, to minimise the effects of a burst. Manufacture of the wheel involves the presence of an integrated annular bag suitable to store an amount of compressed air under high pressure. A safety pressure valve is placed between said bag and the tyre and is adapted to release air from the bag to the tyre each time pressure in the tyre goes down below a predetermined limit.

Patent application WO 03/057515 discloses a wheel assembly for vehicles wherein pressure and temperature inside the tyre are measured at a predefined frequency, and the detected values are transmitted to a processing unit located on the vehicle.

The processing unit, depending on said detected values, selectively causes a fluid connection between the inside area of the tyre and a tank containing pressurized gas and rotationally fixed to the wheel rim, thereby maintaining the desired pressure and temperature inside the tyre.

Patent application Us 2004/0008107 discloses a tyre blow-out detector which is provided with a pressure variation sensor and a transmitting module connected thereto.

When a variation of the tyre pressure is detected, a signal (for example, a HF signal) is transmitted to an on-board apparatus, which alerts the driver of the possible blow-out.

SUMMARY OF THE INVENTION

The Applicant realised that known devices, those of the previously illustrated type for example, do not transmit to the driver a timely warning about a possible puncture so as to enable him/her to stop the vehicle without consequences for the driver himself/herself and the passengers, if any. Moreover the known devices may show an excessive power consumption during use.

More specifically, said devices do not ensure a sufficient margin of safety enabling the vehicle to be stopped before the latter becomes uncontrollable due to a sudden lowering of the inner pressure in the tyre.

In particular, it is the Applicant's perception that a margin of safety can be conveniently obtained not only by quickly feeding pressurized air into the punctured tyre, but also by giving to the driver a warning as soon as the puncture occurs.

In a two-wheeled vehicle this aspect is of vital importance for the rider's safety because due to the particular dynamics of this vehicle, the rider can become aware of such a dangerous situation too late for safely stopping the vehicle.

In fact, in comparison with tyres for four-wheeled vehicles, quite particular performances involving many structural differences are required from tyres for two-wheeled vehicles. The most important differences originate from the fact that during running on a bend a motorcycle must remarkably tilt with respect to the position during a straight run, forming an angle (called camber angle) with the perpendicular to the ground that can reach 45° and, under extreme drive conditions, 65°.

Therefore, when a motorcycle faces a bend, the ground-contact area of the tyre progressively moves from the central region of the tread towards the axially outermost region in the direction of the bend centre. For this reason tyres for two-wheeled vehicles are distinguishable for their marked transverse curvature. This transverse curvature is usually defined by the particular value of the ratio of the distance between the radially outer point of the tread and the line passing through the laterally opposite extremities of the tread itself measured on the equatorial plane of the tyre, to the distance measured along the tyre chord between said extremities. In tyres for two-wheeled vehicles, the value of the curvature ratio is generally not lower than 0.15 and is normally in the order of about 0.3 for rear tyres, but also higher, until about 0.45, for front tyres, against a value usually in the order of about 0.05 in tyres for motor-vehicles.

Moreover, it is to be pointed out that the effects of a quick deflation of the tyres in two-wheeled medium-powered or high-powered vehicles, and in particular in maxi-scooters of the new generation, are very dangerous in terms of incidence on the loss of control of the vehicle, irrespective of the running speed.

More specifically, in case of deflation of the rear tyre a very quick starting of oscillations in the rear axle occurs, which oscillations are amplified until the vehicle becomes uncontrollable. In the case of a full-load configuration and with a passenger the tyre unbeading can occur, which has important consequences for the rider and the passenger.

These effects can be more easily detected on two-wheeled vehicles such as maxi-scooters, due to the strong load on the rear axle connected with positioning of the propeller. For this type of vehicles the danger level is still higher when the engine is of the balancing type and is therefore an integral part of the suspension, because this gives rise to a high value of the oscillating unsprung mass.

When deflation of a front tyre occurs, in addition to the above described effects there are also depreciatory effects on the drive features, since driving becomes harder and this difficulty suddenly appears on a bend when there is a resistance to a variation of the camber angle which will bring about the very dangerous effect of occupying the opposite ride lane.

Although in a car the effects of a quick deflation of a tyre are not as critical as in the case of a two-wheeled vehicle, they are however very dangerous both for the vehicle that, due to an "out-of-control", can be seriously damaged, and for the driver and the passengers that, even though well protected by the vehicle bodywork and the modern safety systems (such as pre-tensioning of the belts, airbags, bars against intrusion on the structure), are in any case exposed to injuries and lesions that can also be very serious depending on the impact velocity.

In the Applicant's view, only a timely alarm informing of a puncture in progress can help the driver to adopt the necessary measures for speed reduction in a well-timed manner before the pressure values reach a threshold making them uncontrollable. In addition, it is the Applicant's perception that the capability of quickly restoring a sufficient pressure at the inside of a punctured tyre allows the phase of instability of the vehicle before full stopping of same to be avoided.

Moreover the sensor and the electrical circuit employed to detect punctures in the tyre and to inform the driver of the incoming danger, are mounted on the wheel and generally can not be directly connected to the power supply unit positioned onboard.

Thus, said sensor and electrical circuit have to be powered in a different way, such as for example by means of batteries mounted on the wheel, preferably close to the sensor and the electrical circuit associated thereto.

When the batteries are exhausted, it is necessary to remove them from the wheel and to provide the sensor with a new power supply unit, so that the detection and alerting tasks can be properly carried out, performing a reliable monitoring of the condition of the tyre.

Consequently, it is the Applicant's perception that a detecting circuit (comprising at least a sensor and an electric circuit), whose consumption is reduced at a minimum, needs less frequent substitutions of the power supply unit, thereby reducing the overall costs and complexity of maintenance activities of the tyre.

Therefore, the Applicant has found that it is possible to ensure a minimum power consumption and a safe stopping of the vehicle in case of puncture of a tyre by arranging a system for pressure recovery on the wheel and giving the driver an alarm signal informing of the puncture in progress, through measurement of the pressure variation internally of the tank in a time unit, said measuring being activated only when a predetermined pressure variation has been detected.

Consequently the timely warning sent and the simultaneous fluid flow towards the tyre for pressure restoration enable the above mentioned margin of safety to be achieved, because the vehicle keeps stable and drivable at least for the period of time necessary for carrying out stopping of same.

Further, the reduced power consumption increases the autonomy of the detecting circuit mounted on the wheel, so that the detection and alerting activities can be properly carried out for a long time before a battery substitution becomes necessary.

In a first aspect the invention relates to a method of allowing a control of a vehicle with at least two-wheels in case of puncture of a tyre, each wheel comprising a rim and a tyre associated therewith, said method comprising the steps of:
  inflating each tyre to an operating pressure;
  admitting a fluid compressed to a first pressure higher than the operating pressure of said tyre, into at least one tank associated with at least one of said rims;
  bringing said tyre into communication with said tank when the inner pressure of said tyre is lower than a predetermined first threshold value;
  detecting a variation of an inner pressure of said tank;
  activating a pressure measuring device when said inner pressure variation corresponds to a reduction and is higher than a first predetermined value;
  measuring the inner pressure of said tank with a predetermined frequency by means of said pressure measuring device;
  calculating a variation in said inner pressure in a time unit;
  generating an alarm signal when said calculated inner pressure variation corresponds to a reduction and is higher than a second predetermined value;
  transmitting said alarm signal to the driver.

In another aspect, the invention relates to a vehicle having at least two wheels, comprising:
  at least one rim operatively associated with a tank adapted to be filled with a fluid to a first pressure;
  a tyre mounted on said rim and inflated to an operating pressure, said operating pressure being lower than said first pressure;
  at least one valve adapted to regulate a communication between said tank and tyre so as to bring said tank and tyre into mutual communication when the inner pressure of said tyre is lower than a
  predetermined first threshold value;
  at least a device for detecting a variation of an inner pressure of said tank;
  at least a device for measuring the inner pressure of said tank with a predetermined frequency, activable when said inner pressure variation corresponds to a reduction and is higher than a first predetermined value;
  at least one calculation unit to calculate a variation in a time unit of the inner pressure of said tank;
  at least one signal generator operatively associated with said calculation unit and capable of generating an alarm signal when said pressure variation corresponds to a reduction and is higher than a second predetermined value.

In another aspect, the invention relates to a wheel for vehicles comprising:
  at least one rim with which a tank adapted to be filled with a fluid to a first pressure is operatively associated;
  a tyre mounted on said rim and inflated to an operating pressure, said operating pressure being lower than said first pressure;
  at least one valve adapted to regulate a communication between said tank and tyre so as to bring said tank and tyre into mutual communication when the inner pressure of said tyre is lower than a predetermined first threshold value;
  at least a device for detecting a variation of an inner pressure of said tank;
  at least a device for measuring the inner pressure of said tank with a predetermined frequency, activable when said inner pressure variation corresponds to a reduction and is higher than a first predetermined value;

at least one calculation unit to calculate a variation in a time unit of the inner pressure of said tank;

said calculation unit being associable to a signal generator for generating an alarm signal when said pressure variation corresponds to a reduction and is higher than a second predetermined value.

It is necessary to point out that, to the aims of the present invention, each comparison between different pressure values (the pressure of the fluid in the tank and the inner pressure of the tyre, for example) is referred to the same reference temperature TR so as to make the comparison uniform, should pressures be measured at different temperatures.

Further features and advantages of the invention will become more apparent from the detailed description of some preferred, but not exclusive, embodiments of a method of allowing a control on a vehicle having at least two wheels in case of puncture of a tyre and of a vehicle to which said method can apply.

BRIEF DESCRIPTION OF THE DRAWINGS

This description will be set out hereinafter with reference to the accompanying drawings, given by way of non-limiting example, in which:

FIG. 1 is a vertical view of a wheel of a two-wheeled vehicle in accordance with the invention;

FIG. 2 is a side view partly in section of the wheel shown in FIG. 1;

DETAILED DESCRIPTION OF THE INVENTION

Figure 4:
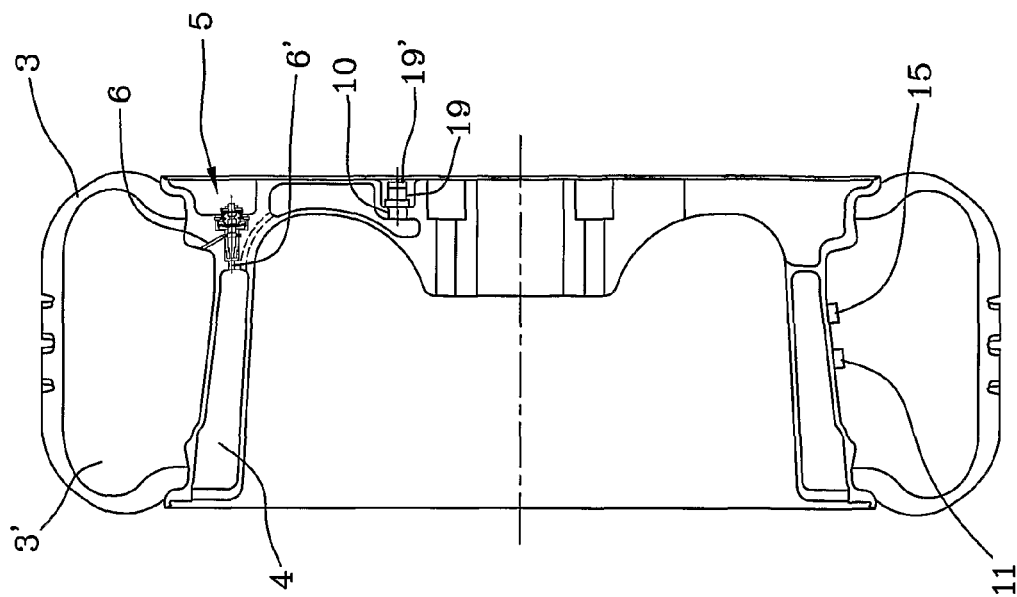
FIG. 4 is a side view partly in section of the wheel shown in FIG. 3.
Figure 3:
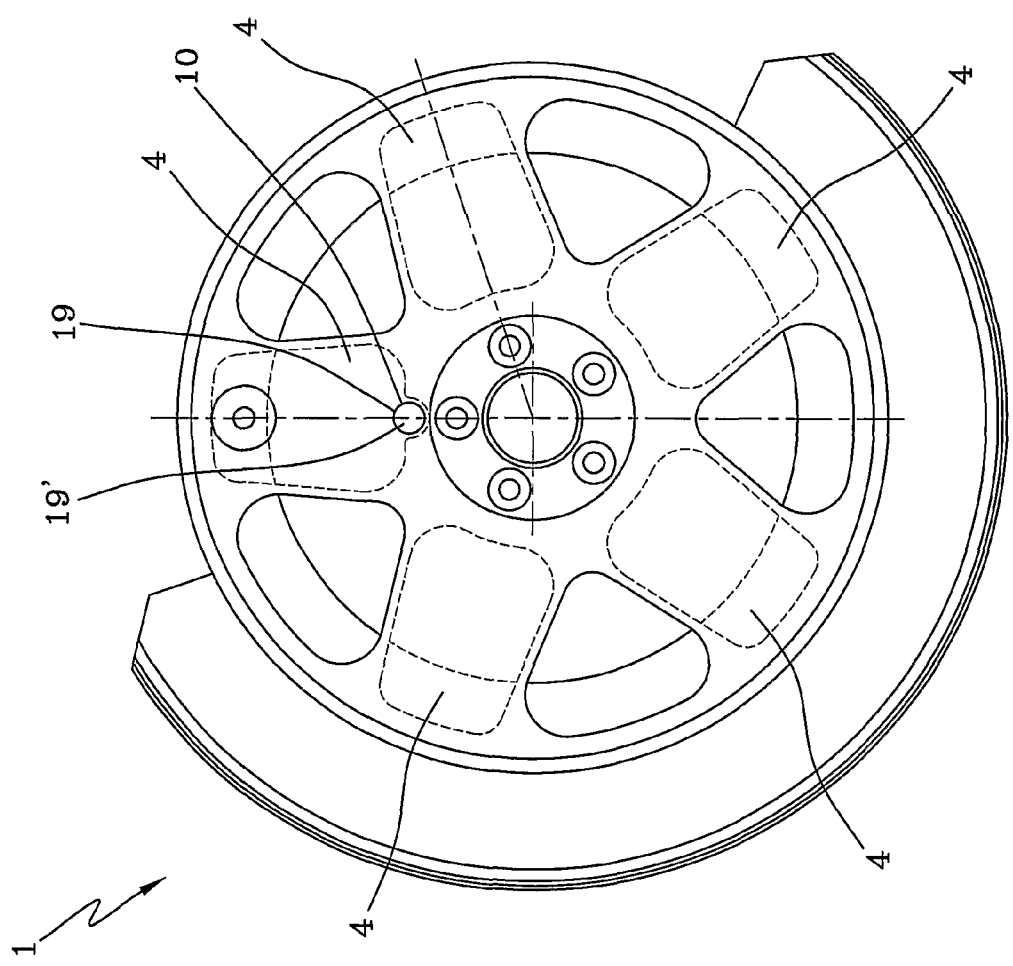
FIG. 3 is a partial vertical view of a wheel of a four-wheeled vehicle in accordance with the invention.

As shown in FIGS. 1, 2, 3 and 4, at least one wheel 1 (FIGS. 1, 2) for a two-wheeled vehicle in accordance with the invention and preferably at least one pair of driving wheels 1 for a four-wheeled vehicle (FIGS. 3, 4) in accordance with the invention, comprise a rim 2 on which a tyre 3 of an inner volume 3l is mounted. Associated with said rim 2 and preferably integrated thereinto is a tank 4 suitable to hold a fluid under pressure, said fluid being air or a substantially inert gas such as nitrogen, for example.

According to a preferred embodiment, the ratio between the operating pressure PE of the tyre 3 and a first pressure PP existing in said full-load tank 4 varies between about 0.1 and about 0.6, preferably between about 0.2 and about 0.4.

According to a further preferred embodiment, the ratio between the volume of said tank 4 and said inner volume 3' of the tyre is included between about 0.1 and about 0.4, preferably between about 0.12 and about 0.3.

The rim 2 preferably houses a valve 5 for example at a radially inner position (FIG. 2) not far from the rotation centre of the wheel, which valve enables communication between the tank 4 and the inner volume 3' of the tyre 3 to be regulated.

Said communication can be obtained for example by providing the rim 2 with an internal duct 6 for connecting said valve 5 to the inner volume of said tyre 3, said valve 5 further providing a direct connection (FIG. 2) or a connection through another duct 6' (FIG. 4) with said tank 4.

Said valve 5 can be of the mechanical type or can be a solenoid valve fed from a power source present on the wheel or coming from the vehicle.

Preferably the tank 4 and the tyre 3 are brought into mutual communication by means of said valve 5 when the inner pressure Pi of the tyre 3 is lower than a first predetermined threshold value Vs*.

In such a way, significant losses of air from the tyre 3 can be compensated with the fluid contained in the tank 4 and flowing into the tyre 3.

A device 30 for detecting a variation of the inner pressure Ps of the tank 4 is operatively associated to the wheel 1.

When the detected inner pressure variation corresponds to a reduction and is higher than a first predetermined value Vp1, the device 30 which detected said variation activates a device 31 for measuring, with a predetermined frequency F, the inner pressure Ps of the tank 4.

In a preferred embodiment, the function of the device for detecting the variation of the inner pressure Ps of the tank 4 and the function of the device 31 for measuring the inner pressure Ps of the tank 4 are both performed by a same device, for instance a pressure sensor 10.

The pressure sensor 10 can be placed in the tank 4.

Preferably, the pressure sensor 10 is placed on a closing element 19' adapted to close an inlet of the tank 4, said inlet being provided for allowing the tank 4 to be filled with the proper fluid.

The pressure sensor 10 can be a mechanical sensor, an electromechanical sensor, or an electrical sensor; in particular, the pressure sensor 10 can be made as described in U.S. Pat. No. 5,168,751 (which discloses a digital tyre pressure gauge) or in U.S. Pat. No. 5,179,856 (which discloses a different pressure gauge). Both U.S. Pat. No. 5,168,751 and U.S. Pat. No. 5,179,856 are herewith incorporated by reference, as to the structure and working of the disclosed pressure sensors.

In practice, the pressure sensor 10 can be an "analogue" sensor, i.e. a sensor which does not merely provide an on-off (or 0-1) output, representative of whether or not the inner pressure Ps of the tank 4 is lower than a certain threshold, but it provides an electrical and/or mechanical output proportional to the inner pressure Ps of the tank 4, said output being in particular provided only if such inner pressure Ps variation is lower than the first predetermined value Vp1.

Connected to the device 31 for measuring the inner pressure Ps of the tank 4, is a calculation unit 32, capable of calculating a variation Vp in a time unit of the inner pressure Ps of the tank 4.

Preferably the calculation 32 unit is not on the vehicle, but is integrated with the aforementioned pressure sensor 10.

The pressure sensor 10, and in particular the device for measuring the inner pressure Ps of the tank 4, carries out pressure measurement within the volume of tank 4 with a predetermined frequency F, this frequency being preferably included between about 0.05 Hz and about 50 Hz, and more preferably between about 0.1 Hz and 10 Hz, the Applicant considering the last-mentioned range a good compromise between the necessity to acquired data at the highest possible frequency and with a reduced energy consumption by the pressure sensor 10.

Said calculation unit 32, knowing the acquisition frequency F of the datum concerning the inner pressure Ps of tank 4 and receiving from the pressure sensor 10 the subsequent values Ps found at the different instants n and n+1, calculates the pressure variation Vp in the time unit in the manner hereinafter illustrated:

$$Vp=[(Ps)_{n+1}-(Ps)_n]\times F$$

In accordance with the invention, operatively associated with the calculation unit 32 is a signal generator 33 of the acoustic, electronic, lighted, digital or any other type capable of generating a signal at the moment the value of Vp is negative (i.e. there is a reduction in pressure Ps in the time unit), and overcomes a second predetermined value Vp2 in absolute value.

Preferably said second predetermined value Vp2 is included between about 0.005 bar/s and about 0.2 bar/s, and more preferably this value is included between about 0.01 bar/s and about 0.05 bar/s.

Advantageously, the first predetermined value Vp1 can be substantially equal to the second predetermined value Vp2.

After the above statements, it is to be pointed out that valve 5 follows a relatively simple operation scheme. When the inner pressure Pi of tyre 3 is lower than a predetermined first threshold value Vs*, valve 5, if it is of the mechanical type, is calibrated in such a manner as to enable a fluid flow from tank 4 to the inner volume 3' until said value Vs* is overcome again by the inner pressure Pi.

Preferably said first threshold value Vs* is included between about 0.8 PE and about 0.95 PE.

In case of a puncture, the fluid stored in the tank 4 flows through valve 5 into the tyre 3, so that the tyre is allowed to work properly for a longer time and the driver can safely stop the vehicle.

Such flow of fluid causes a reduction of the inner pressure of the tank 4; the variation is detected by said device 30 for detecting a variation of the inner pressure Ps of the tank.

If the variation overcomes the first predetermined value Vp1, the device 31 for measuring the inner pressure of the tank 4 is activated, and the measured value is provided to the calculation unit 32.

If the variation Vp of the inner pressure Ps in the time unit overcomes a second predetermined value (i.e. the inner pressure Ps of the tank 4 is decreasing very quickly, which means that a puncture has occurred), the signal generator 33 generates a proper alarm signal to warn the driver of the incoming danger.

The signal generator 33, in a further preferred embodiment of the invention, is operatively associated with a transmission system 34 preferably arranged onboard of the vehicle, which is capable of transmitting said signals to the driver's position, preferably by a pilot light associated with an acoustic signal.

In addition, if a solenoid valve is used as the valve 5, operation of same can be actively determined by the detections carried out by said pressure sensor 10, through a signal generated by the sensor itself or through the signal generator 33.

In particular, when the variation Vp of the inner pressure Ps of the tank 4 corresponds to a reduction and is higher than the second predetermined value Vp2, the solenoid valve 5 is operated to maintain the tyre 3 into communication with the tank 4, so that the tyre 3 can be re-filled with the fluid of the tank 4, thereby increasing the duration of its working life.

Also provided in wheel 1 is the presence of a second pressure sensor 15 housed on the rim 2 or internally of the tyre 3, to measure the inner pressure Pi of the tyre 3.

The second pressure sensor 15 is operatively associated with the signal generator 33 to generate an alarm signal when the inner pressure Pi of the tyre 3 is lower than the predetermined threshold value Vs*.

Preferably a temperature sensor 11 is further provided, which is operatively associated with the wheel 1 to measure the inner temperature of the tyre 3.

More in particular, the temperature sensor 11 can be operatively associated with the calculation unit for calculating the pressure corresponding to a reference temperature TR for each inner pressure Pi measured by the second pressure sensor 15.

In a preferred embodiment, the temperature sensor 11 is integrated with the second pressure sensor 15.

Advantageously, in a preferred embodiment of the invention, calculation of the inner pressure Pi of the tyre 3 is carried out with temperature compensation of same. More specifically, since the pressure of a gas is substantially proportional to the absolute temperature, a temperature variation causes a pressure variation that is not due to gas leaks or admissions from and to the tyre. Said compensation preferably takes place in the following way: the calculation unit receives an information concerning pressure from the second pressure sensor 15 and an information concerning temperature from the temperature sensor 11 (which is disposed on rim 2 or internally of tyre 3 as well); through subsequent application of the gas laws, the calculation unit draws the pressure value at said reference temperature TR. Then, calculated on these compensated pressure values is the inner pressure Pi of said tyre 3.

In addition, in a different embodiment of the invention, the calculation unit is not on the vehicle, but is integrated with the pressure sensor 10.

In a further preferred embodiment, the pressure sensor 10 can periodically generate a signal representative of the current value of the inner pressure Ps of the tank 4.

Such periodical signal is compared with a predetermined second threshold value Vs, representative of a minimum operative level of the tank 4**.

The second threshold value Vs** is preferably included between about 1.2 PE and about 2.5 PE.

If the pressure Ps is lower than the predetermined second threshold value Vs, an alarm signal is generated to alert the driver, since the tank 4** is to be re-filled with a proper amount of compressed fluid.

The method in accordance with the invention is preferably put into practice with the following modalities. First by a normal compressor for example, fluid, preferably air, is admitted into tank 4 through an inflating valve 19 to a given room temperature, of 15, 20, 25° C. or another value for example, that will correspond to said reference temperature TR.

Tyre 3 is first flat and therefore valve 5 connects tank 4 to the inner volume 3' of tyre 3. When pressure within the tyre reaches the prescribed operating pressure PE, valve 5 reaches its closed position preventing passage of air under pressure between tank 4 and the inner volume 3' of said tyre 3. Tank 4 is then charged to said first pressure PP, generally included between about 8 and about 12 bars, more preferably between about 8.5 and about 10 bars.

During operation of the vehicle on which wheels 1 in accordance with the invention are mounted, small air leakages occur that are due to a non-perfect imperviousness of the liner of the carcass structure of the tyre for example, or a non-perfect adhesion between the tyre bead and the rim flange on which the bead rests, which leakages can be quantified in about 0.1 bar/month. When the inner pressure Pi of tyre 3 decreases and the first threshold value Vs* is reached, valve 5 opens due to its calibration if it is of the mechanical type or to a signal sent by the second pressure sensor 15 or said signal generator if valve 5 is a solenoid valve, until pressure Pi reaches the PE value again.

In this case the first threshold value Vs* enables opening of valve 5 only after the Pi value has reached at least Vs*, i.e. a value included between about 0.8 PE and about 0.95 PE. In this manner steadiness to the wheel assembly is ensured since small recharges in case of minimum pressure losses are avoided.

When tyre 3 is punctured, the Pi value reaches Vs* quickly and as above illustrated valve 5 opens and generates a continuous air flow into tyre 3.

In addition, when a puncture occurs, the Pi value varies rather quickly in time at least until opening of said valve 5; as described above, said quick variation of the inner pressure Pi of the tyre 3 causes a corresponding rapid variation of the inner pressure Ps of the tank 4, thereby activating the detection and measurement operations of the pressure sensor 10.

Consequently the Ps variation in the time unit calculated as above illustrated by the calculation unit 32 can overcome the limit of Vp2 and in this case the signal generator 33 is activated. Said signal generator 33 generates a signal that is transmitted as an alarm signal to the vehicle's driver preferably in the form of a combination of a signal light on the dashboard and an acoustic signal.

By contrast, it may happen that a mechanical/resilient detecting portion of the device 30 for detecting a variation of the inner pressure Ps of the tank 4 undergoes a sudden movement, due to an external force and not to an actual variation of said inner pressure Ps.

In such a case, the movement of the detecting portion of the device 30 may be sufficient to activate the device 31 for measuring the inner pressure of the tank 4 and the calculation unit 32.

However, the measurement performed by the device 31 and the calculation of the calculation unit 32 would reveal that the activation signal coming from the device 30 was not due to an actual quick decrease of the inner pressure of the tyre 3 and the tank 4, and consequently the alarm signal would not be generated by the signal generator.

The driver of a two-wheeled or four-wheeled vehicle being promptly warned, he/she begins slowing down until the vehicle stops while the fluid flow is moving from tank 4 to the inside of the punctured tyre 3 thereby enabling vehicle braking and stopping in a very safe manner, the vehicle instability being avoided.

Further, it is to be noted that a significant reduction of power consumption is achieved by virtue of the fact that the device for measuring the inner pressure of the tank 4 is activated only when a variation beyond the first predetermined value Vp1 is detected.

Therefore, measurement of the inner pressure Ps of the tank 4 and calculation of the variation of said inner pressure Ps in the time unit are performed only when actually necessary, i.e. when a puncture in the tyre is likely to have occurred.

EXAMPLES

Figure 5:
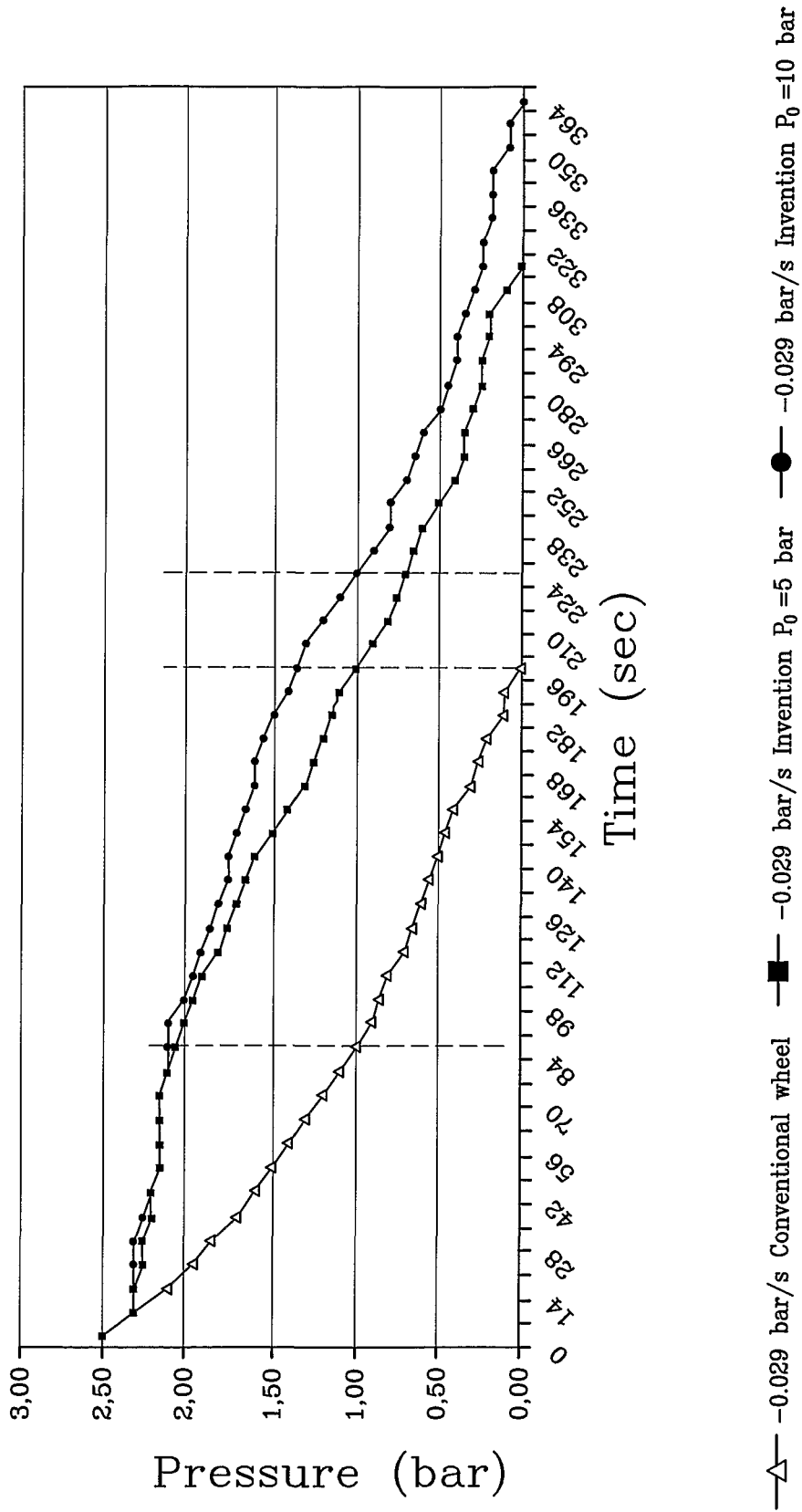
FIG. 5 represents a graph showing the pressure variation in time in case of puncture of a wheel of a two-wheeled vehicle in accordance with the invention and in a wheel of a two-wheeled vehicle of known type.

The results of puncture tests carried out on a front wheel of a two-wheeled vehicle in accordance with the invention and on a front wheel of a two-wheeled vehicle of the conventional type are reproduced in FIG. 5 in a diagram time (x axis)/pressure (y axis); (the wheel of said conventional type being devoid of tank 4 and valve 5 and only having a normal inflation/restoration valve inserted in the tyre). Both wheels have the respective inner volumes of the tyre equal to 0.009 $m^3$ and a starting pressure of 2.5 bars. It is possible to see that when a puncture causing a starting loss of pressure equal to about 0.029 bar/second is simulated, in the wheel belonging to the vehicle of the invention that is equipped with a tank having a volume of 0.0025 $m^3$ at a starting pressure of about 10 and 5 bars, after about 1 minute and 25 seconds, a residual pressure of about 2.15 and 2.1 bars is respectively found, while in the wheel belonging to a conventional vehicle there is a pressure of only about 1 bar. After about 205 seconds the residual pressure of the wheel belonging to the vehicle in accordance with the invention is still of about 1.35 and 1 bar respectively, whereas the pressure in the wheel of a conventional vehicle has gone to zero (gauge pressures).

Figure 6:
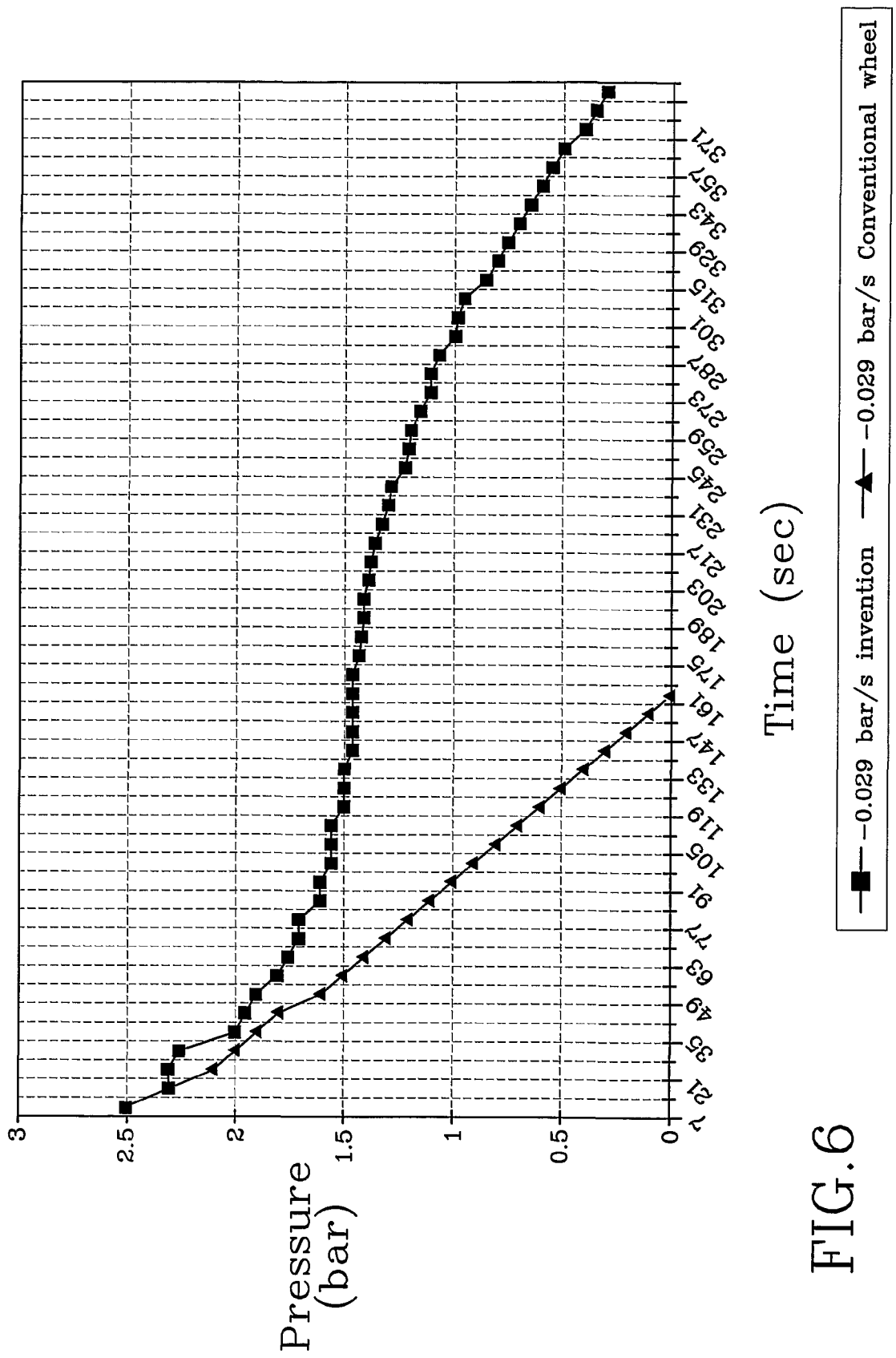
FIG. 6 is a graph showing the pressure variation in time in case of puncture of a wheel of a four-wheeled vehicle in accordance with the invention and in a wheel of a four-wheeled vehicle of known type.
Figure 7:
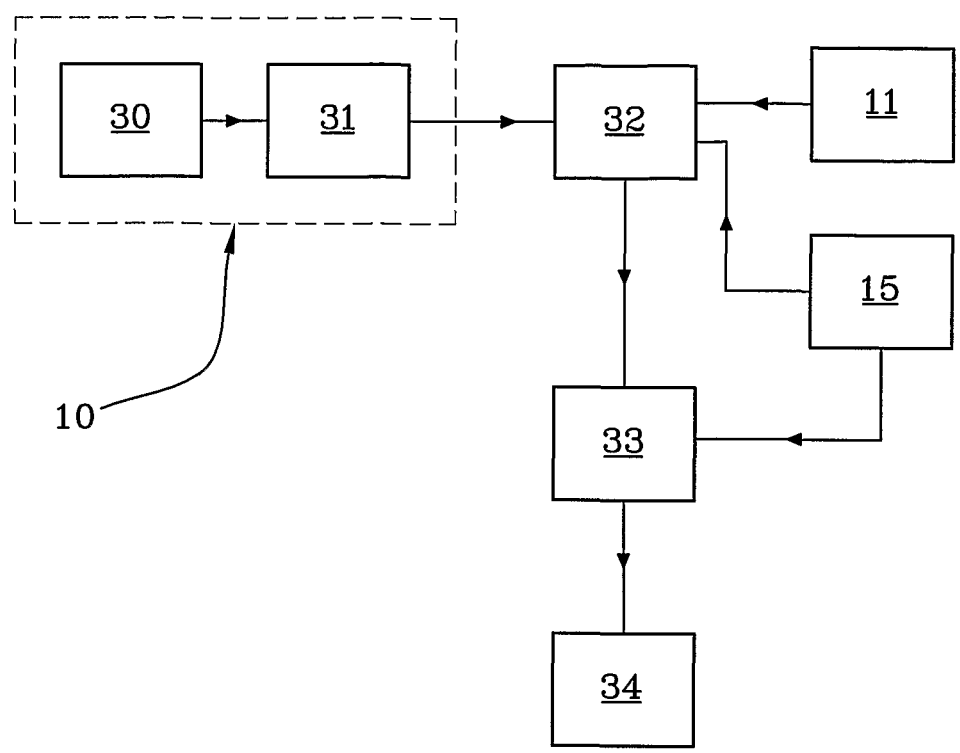
FIG. 7 is a block diagram representing some components used in the method and in the vehicle in accordance with the invention.

The results of puncture tests carried out on a wheel of a four-wheeled vehicle in accordance with the invention and on a wheel of a four-wheeled vehicle of the conventional type are reproduced in FIG. 6 in a diagram time (x axis)/pressure (y axis); (the wheel of said conventional type being devoid of tank 4 and valve 5 and only having a normal inflation/restoration valve inserted in the tyre). Both wheels have the respective inner volumes of the tyre equal to 0.06 $m^3$ and a starting pressure of 2.5 bars. It is possible to see that when a puncture causing a starting loss of pressure equal to about 0.029 bar/second is simulated, in the wheel belonging to the vehicle of the invention (equipped with a tank having a volume of 0.009 $m^3$ at a starting pressure of about 9 bars) after about 2 minutes a residual pressure of about 1.5 bars is found, while in the wheel belonging to a conventional vehicle there is a pressure of only about 0.65 bar. After about 165 seconds the residual pressure of the wheel in accordance with the invention is still of about 1.45 bar, whereas the pressure in the wheel of a conventional vehicle has gone to zero (gauge pressures).

As above stated, it can be easily understood that due to this gradual pressure lowering the driver is able to stop the vehicle in a very safe manner and to always have the vehicle control.

It will be finally recognised that in the above described tests use of a tank 4 charged to 5 bars simulates the pressure of tank 4 after about six months of use if charged to 10 bars at the beginning. As previously illustrated, in fact, tyre 3 is submitted to an air leak of about 0.1 bar/month, which leak is restored, as above illustrated, by the charge present in tank 4.

The invention claimed is:

1. A method of allowing control of a vehicle with at least two-wheels in case of puncture of a tyre, each wheel comprising a rim and a tyre associated therewith, comprising the steps of:
   inflating each tyre to an operating pressure;
   admitting a fluid compressed to a first pressure higher than the operating pressure of said tyre into at least one tank associated with at least one of said rims;
   bringing said tyre into communication with said tank when the inner pressure of said tyre is lower than a predetermined first threshold value;
   detecting a rate of variation of an inner pressure of said tank;
   activating a pressure measuring device when said rate of inner pressure variation corresponds to a reduction and is higher than a first predetermined rate value;
   measuring the inner pressure of said tank with a predetermined frequency (F) by means of said pressure measuring device;
   calculating a rate of variation in said inner pressure in a time unit;
   generating an alarm signal when said calculated rate of inner pressure variation corresponds to a reduction and is higher than a second predetermined rate value; and
   transmitting said alarm signal to the driver.

2. The method as claimed in claim 1, wherein said tank is integrated into said rim.

3. The method as claimed in claim 1, wherein said vehicle is a two-wheeled vehicle and said rim associated with said tank is associated with the front wheel.

4. The method as claimed in claim 1, wherein said vehicle is a two-wheeled vehicle and said rim associated with said tank is associated with the rear wheel.

5. The method as claimed in claim 1, comprising the step of interrupting said communication between said tyre and tank when the inner pressure of said tyre is substantially the same as said operating pressure.

6. The method as claimed in claim 1, wherein said time unit corresponds to 1/F.

7. The method as claimed in claim 6, wherein said predetermined frequency (F) is between about 0.05 Hz and about 50 Hz.

8. The method as claimed in claim 7, wherein said predetermined frequency (F) is between about 0.1 Hz and about 10 Hz.

9. The method as claimed in claim 1, wherein said second predetermined rate value of the rate of variation in the time unit of the inner pressure of said tank is between about 0.005 bar/s and about 0.2 bar/s.

10. The method as claimed in claim 9, wherein said second predetermined rate value of the rate of variation in the time unit of the inner pressure of said tank is between about 0.01 bar/s and about 0.05 bar/s.

11. The method as claimed in claim 1, wherein said predetermined first threshold value is between about 0.8 PE and about 0.95 PE.

12. The method as claimed in claim 1, comprising the step of generating an alarm signal when the pressure of the fluid contained in said tank is lower than a predetermined second threshold value.

13. The method as claimed in claim 12, wherein said second threshold value is between about 1.2 PE and about 2.5 PE.

14. The method as claimed in claim 12, wherein said signal is transmitted to the driver.

15. The method as claimed in claim 1, comprising the step of measuring the inner temperature of said tyre.

16. The method as claimed in claim 15, comprising the step of measuring the inner pressure of said tyre.

17. The method as claimed in claim 16, comprising the step of calculating, for each inner measured pressure of said tyre at the inner temperature of the tyre, the inner pressure of the tyre corresponding to a reference temperature.

18. The method as claimed in claim 17, comprising the step of bringing said tyre into communication with said tank when the inner pressure of the tyre corresponding to said reference temperature is lower than said predetermined first threshold value.

19. The method as claimed in claim 1, comprising the step of maintaining said tyre into communication with said tank, when the rate of variation of the inner pressure of said tank corresponds to a reduction and is higher than said second predetermined rate value.

20. The method as claimed in claim 1, wherein said first predetermined rate value is substantially equal to said second predetermined rate value.

21. A vehicle having at least two wheels, comprising:
at least one rim operatively associated with a tank adapted to be filled with a fluid to a first pressure;
a tyre mounted on said rim and inflated to an operating pressure, said operating pressure being lower than said first pressure;
at least one valve adapted to regulate communication between said tank and tyre so as to bring said tank and tyre into mutual communication when the inner pressure of said tyre is lower than a predetermined first threshold value;
at least a device for detecting a rate of variation of an inner pressure of said tank;
at least a device for measuring the inner pressure of said tank with a predetermined frequency activable when said rate of inner pressure variation corresponds to a reduction and is higher than a first predetermined rate value;
at least one calculation unit to calculate a rate of variation in a time unit of the inner pressure of said tank;
at least one signal generator operatively associated with said calculation unit and capable of generating an alarm signal when said rate of pressure variation corresponds to a reduction and is higher than a second predetermined rate value.

22. The vehicle as claimed in claim 21, wherein said tank is integrated into said rim.

23. The vehicle as claimed in claim 21, wherein said vehicle is a two-wheeled vehicle and said rim associated with said tank is associated with the front wheel.

24. The vehicle as claimed in claim 21, wherein said vehicle is a two-wheeled vehicle and said rim associated with said tank is associated with the rear wheel.

25. The vehicle as claimed in claim 21, wherein the ratio between the volume of said tank and the inner volume of said tyre is between about 0.1 and about 0.4.

26. The vehicle as claimed in claim 25, wherein said ratio between the volume of said tank and the inner volume of said tyre is between about 0.12 and about 0.3.

27. The vehicle as claimed in claim 21, wherein the ratio between said operating pressure of said tyre and said first pressure is between about 0.1 and about 0.6 at a reference temperature.

28. The vehicle as claimed in claim 27, wherein the ratio between said operating pressure of said tyre and said first pressure is between about 0.2 and about 0.4 at said reference temperature.

29. The vehicle as claimed in claim 21, wherein said device for detecting the rate of variation of said inner pressure of said tank and said device for measuring the inner pressure of said tank are integrated in a pressure sensor.

30. The vehicle as claimed in claim 29, wherein said pressure sensor is placed in said tank.

31. The vehicle as claimed in claim 29, wherein said tank is provided with an inlet for filling said tank with said fluid, said pressure sensor being placed on a closing element of said inlet.

32. The vehicle as claimed in claim 21, wherein a second pressure sensor is operatively associated with said tyre to measure the inner pressure of said tyre.

33. The vehicle as claimed in claim 32, wherein said second pressure sensor is operatively associated with said signal generator to generate an alarm signal when the inner pressure of said tyre is under said predetermined first threshold value.

34. The vehicle as claimed in claim 33, wherein said predetermined first threshold value is between about 0.8 PE and 0.95 PE.

35. The vehicle as claimed in claim 21, wherein said signal generator is operatively associated with a transmission system to transmit the alarm signals generated by said generator to the driver.

36. The vehicle as claimed in claim 21, wherein said valve is a solenoid valve.

37. The vehicle as claimed in claim 29, wherein said pressure sensor measuring the inner pressure of the tank controls said communication between said tank and tyre by means of said valve.

38. The vehicle as claimed in claim 37, wherein said pressure sensor controls said communication by means of said signal generator.

39. The vehicle as claimed in claim 36, wherein said solenoid valve is operatively associated with said signal generator to maintain said tyre in communication with said tank when the rate of variation of the inner pressure of said tank corresponds to a reduction and is higher than said second predetermined rate value.

40. The vehicle as claimed in claim 21, wherein a temperature sensor is provided which is operatively associated with said wheel to measure the inner temperature of the tyre.

41. The vehicle as claimed in claim 40, wherein said temperature sensor is operatively associated with said calculation unit to calculate the pressure corresponding to a reference temperature for each inner pressure measured by said second pressure sensor at the inner temperature of the tyre.

42. The vehicle as claimed in claim 41, wherein said temperature sensor is integrated with said second pressure sensor.

43. The vehicle as claimed in claim 21, wherein said first pressure is between about 8 bars and about 12 bars.

44. The vehicle as claimed in claim 21, wherein said first predetermined rate value is substantially equal to said second predetermined rate value.

45. A wheel for vehicles, comprising:
- at least one rim operatively associated with a tank adapted to be filled with a fluid to a first pressure;
- a tyre mounted on said rim and inflated to an operating pressure, said operating pressure being lower than said first pressure;
- at least one valve adapted to regulate a communication between said tank and tyre so as to bring said tank and tyre into mutual communication when the inner pressure of said tyre is lower than a predetermined first threshold value;
- at least a device for detecting a rate of variation of an inner pressure of said tank;
- at least a device for measuring the inner pressure of said tank with a predetermined frequency activable when said rate of inner pressure variation corresponds to a reduction and is higher than a first predetermined rate value; and
- at least one calculation unit to calculate a variation in a time unit of the inner pressure of said tank,
- said calculation unit being associable with a signal generator for generating an alarm signal when said rate of pressure variation corresponds to a reduction and is higher than a second predetermined rate value.

46. The wheel as claimed in claim 45, wherein said tank is integrated into said rim.

47. The wheel as claimed in claim 45, wherein the ratio between the volume of said tank and the inner volume of said tyre is between about 0.1 and about 0.4.

48. The wheel as claimed in claim 47, wherein said ratio between the volume of said tank and the inner volume of said tyre is between about 0.12 and about 0.3.

49. The wheel as claimed in claim 45, wherein the ratio between said operating pressure of said tyre and said first pressure is between about 0.1 and about 0.6 at a reference temperature.

50. The wheel as claimed in claim 49, wherein said ratio between said operating pressure of said tyre and said first pressure is between about 0.2 and about 0.4 at said reference temperature.

51. The wheel as claimed in claim 45, wherein said device for detecting the rate of variation of said inner pressure of said tank and said device for measuring the inner pressure of said tank are integrated in a pressure sensor.

52. The wheel as claimed in claim 51, wherein said pressure sensor is placed in said tank.

53. The wheel as claimed in claim 51, wherein said tank is provided with an inlet for filling said tank with said fluid, said pressure sensor being placed on a closing element of said inlet.

54. The wheel as claimed in claim 45, wherein a second pressure sensor is operatively associated with said tyre to measure the inner pressure of said tyre.

55. The wheel as claimed in claim 54, wherein said second pressure sensor is operatively associable with said signal generator to generate an alarm signal when the inner pressure of said tyre is under said predetermined first threshold value.

56. The wheel as claimed in claim 55, wherein said predetermined first threshold value is between about 0.8 PE and 0.95 PE.

57. The wheel as claimed in claim 45, wherein said valve is a solenoid valve.

58. The wheel as claimed in claim 51, wherein said pressure sensor measuring the inner pressure of the tank controls said communication between said tank and tyre by means of said valve.

59. The wheel as claimed in claim 58, wherein said solenoid valve is operatively associable with said signal generator to maintain said tyre in communication with said tank when the rate of variation of the inner pressure of said tank corresponds to a reduction and is higher than said second predetermined rate value.

60. The wheel as claimed in claim 45, further comprising a temperature sensor to measure the inner temperature of the tyre.

61. The wheel as claimed in claim 60, wherein said temperature sensor is operatively associated with said calculation unit to calculate the pressure corresponding to a reference temperature for each inner pressure measured by said second pressure sensor at the inner temperature of the tyre.

62. The wheel as claimed in claim 61, wherein said temperature sensor is integrated with said second pressure sensor.

63. The wheel as claimed in claim 45, wherein said first pressure is between about 8 bars and about 12 bars.

64. The wheel as claimed in claim 45, wherein said first predetermined rate value is substantially equal to said second predetermined rate value.

* * * * *